US010800965B2

(12) United States Patent
Hampton et al.

(10) Patent No.: US 10,800,965 B2
(45) Date of Patent: Oct. 13, 2020

(54) COMPOSITIONS INCLUDING MODIFIED RELEASE MATERIAL FOR TREATMENT OF SUBTERRANEAN FORMATIONS

(71) Applicant: Halliburton Energy Services, Inc., Houston, TX (US)

(72) Inventors: Evelyn F. Hampton, Webster, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/564,725

(22) PCT Filed: May 5, 2015

(86) PCT No.: PCT/US2015/029291
§ 371 (c)(1),
(2) Date: Oct. 5, 2017

(87) PCT Pub. No.: WO2016/178672
PCT Pub. Date: Nov. 10, 2016

(65) Prior Publication Data
US 2018/0112123 A1 Apr. 26, 2018

(51) Int. Cl.
*C09K 8/70* (2006.01)
*C09K 8/62* (2006.01)
*C09K 8/64* (2006.01)
*C09K 8/80* (2006.01)
*E21B 43/26* (2006.01)
(Continued)

(52) U.S. Cl.
CPC .............. *C09K 8/706* (2013.01); *C09K 8/62* (2013.01); *C09K 8/64* (2013.01); *C09K 8/80* (2013.01); *E21B 43/26* (2013.01); *C09K 2208/24* (2013.01); *C09K 2208/26* (2013.01);
(Continued)

(58) Field of Classification Search
None
See application file for complete search history.

(56) References Cited

U.S. PATENT DOCUMENTS 4,506,734 A * 3/1985 Nolte ....................... C09K 8/92
166/300
4,741,401 A * 5/1988 Walles ................... C09K 8/685
166/300
(Continued)

FOREIGN PATENT DOCUMENTS

WO 2009032524 A1 3/2009
WO 2015023648 A1 2/2015

OTHER PUBLICATIONS

International Search Report and Written Opinion dated Feb. 5, 2016, for PCT Application No. PCT/US2015/029291 filed on May 5, 2015. 16 pages.

*Primary Examiner* — Anuradha Ahuja
(74) *Attorney, Agent, or Firm* — Chamberlain Hrdlicka

(57) ABSTRACT

Compositions including modified release material for treatment of subterranean formations are provided. Also provided is a method of treating a subterranean formation including placing in the subterranean formation a composition including a modified release material. The modified release material can include an additive and a solid substituted or unsubstituted fatty acid having a melting point of about 30° C. to about 250° C., wherein the additive is partially or wholly enveloped by the fatty acid.

15 Claims, 2 Drawing Sheets

(51) Int. Cl.
*E21B 37/06* (2006.01)
*E21B 43/267* (2006.01)

(52) U.S. Cl.
CPC .......... *C09K 2208/32* (2013.01); *E21B 37/06* (2013.01); *E21B 43/267* (2013.01)

(56) References Cited

U.S. PATENT DOCUMENTS

| | | | |
|---|---|---|---|
| 4,770,796 A * | 9/1988 | Jacobs | C09K 8/685 166/307 |
| 5,591,700 A * | 1/1997 | Harris | C09K 8/68 507/214 |
| 6,265,355 B1 | 7/2001 | Lai et al. | |
| 7,287,590 B1 * | 10/2007 | Sullivan | C09K 8/68 166/300 |
| 7,347,266 B2 | 3/2008 | Crews et al. | |
| 2001/0016562 A1 | 8/2001 | Muir et al. | |
| 2003/0234103 A1 * | 12/2003 | Lee | C09K 8/516 166/293 |
| 2006/0018999 A1 | 1/2006 | Risch | |
| 2007/0032386 A1 * | 2/2007 | Abad | C09K 8/508 507/201 |
| 2007/0117723 A1 * | 5/2007 | Carpenter | C09K 8/68 507/110 |
| 2008/0302570 A1 | 12/2008 | Deboer | |
| 2010/0163228 A1 | 7/2010 | Abad et al. | |
| 2012/0247774 A1 * | 10/2012 | Li | C09K 8/685 166/305.1 |
| 2014/0332214 A1 * | 11/2014 | Zhou | E21B 43/267 166/280.2 |
| 2016/0186044 A1 * | 6/2016 | Rothrock | C09K 8/58 166/300 |

\* cited by examiner

COMPOSITIONS INCLUDING MODIFIED RELEASE MATERIAL FOR TREATMENT OF SUBTERRANEAN FORMATIONS

BACKGROUND

Additives for subterranean treatment fluids, such as hydraulic fracturing fluids, can be incompatible with other compounds used during subterranean treatments, and can react before needed or faster than needed. For example, clay control additives, scale inhibitors, sand coating materials, surfactants, pH modifiers, and biocides can negatively impact performance of other chemicals in hydraulic fracturing fluids. Conventional breakers can reduce fracturing fluid viscosity too rapidly even at moderate temperatures, such as below about 200° F. (93° C.).

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
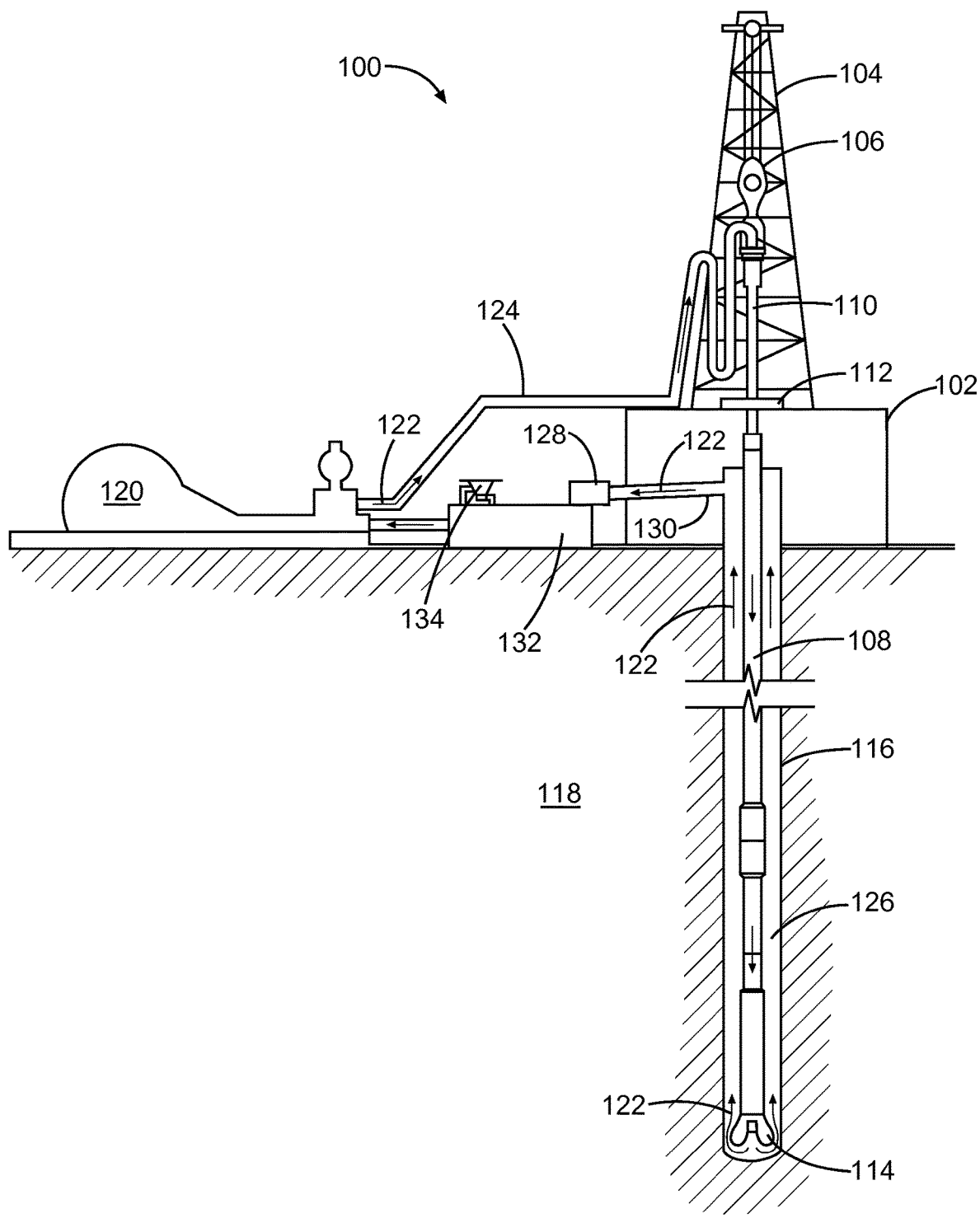
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)

N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are positive integers and mean having any of a to b number of carbon atoms. For example, (C$_1$-C$_4$)hydrocarbyl means the hydrocarbyl group can be methyl (C$_1$), ethyl (C$_2$), propyl (C$_3$), or butyl (C$_4$), and (C$_0$-C$_b$)hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thio sulfate, sulfite, carbonate, chromate, dichromate, peroxide, or oxalate.

In various embodiments, the present invention provides a method of treating a subterranean formation. The method includes placing in the subterranean formation a composition including a modified release material. The modified release material includes an additive and a solid substituted or unsubstituted fatty acid. The solid substituted or unsubstituted fatty acid has a melting point of about 30° C. to about 250° C. The additive is partially or wholly enveloped by the fatty acid.

In various embodiments, the present invention provides a method of treating a subterranean formation. The method includes placing in the subterranean formation a composition including a modified release material. The modified release material includes a solid breaker. The modified release material also includes a solid substituted or unsubstituted fatty acid having a melting point of about 40° C. to about 250° C. The breaker is partially or wholly enveloped by the fatty acid. The modified release material is about 0.001 wt % to about 30 wt % of the composition. The modified release material includes a plurality of modified release material particles, each particle of the modified release material having about 1 to about 100,000 particles of the breaker therein. About 10 wt % to about 80 wt % of each modified release material particle is the breaker. About 20 wt % to about 90 wt % of each modified release material particle is the fatty acid. The fatty acid covers about 50% to about 100% of the total surface area of the combined breaker particles. The method also includes melting the fatty acid in the subterranean formation, thereby releasing the breaker in the subterranean formation.

In various embodiments, the present invention provides a system. The system includes a tubular disposed in a subterranean formation. The system includes a pump configured to pump a composition including a modified release material in the subterranean formation through the tubular. The modified release material includes an additive. The modified release material also includes a solid substituted or unsubstituted fatty acid having a melting point of about 30° C. to about 250° C. The additive is partially or wholly enveloped by the fatty acid.

In various embodiments, the present invention provides a composition for treatment of a subterranean formation. The composition includes a modified release material including an additive. The modified release material also includes a solid substituted or unsubstituted fatty acid having a melting point of about 30° C. to about 250° C. The additive is partially or wholly enveloped by the fatty acid.

In various embodiments, the present invention provides a composition for treatment of a subterranean formation. The composition includes a modified release material including a solid breaker. The modified release material also includes a solid substituted or unsubstituted fatty acid having a melting point of about 40° C. to about 250° C. The breaker is partially or wholly enveloped by the fatty acid. The modified release material is about 0.001 wt % to about 30 wt % of the composition. The modified release material includes a plurality of modified release material particles, each particle of the modified release material having about 1 to about 100,000 particles of the breaker therein. About 10 wt % to about 80 wt % of each modified release material particle is the breaker. About 20 wt % to about 90 wt % of each modified release material particle is the fatty acid. The fatty acid covers about 50% to about 100% of the total surface area of the combined breaker particles.

In various embodiments, the present invention provides a method of preparing a composition for treatment of a subterranean formation. The method includes forming a composition including a modified release material including an additive. The modified release material also includes a solid substituted or unsubstituted fatty acid having a melting point of about 30° C. to about 250° C. The additive is partially or wholly enveloped by the fatty acid.

In various embodiments, the present invention provides certain advantages over other compositions and methods of using the same, at least some of which are unexpected. For example, in some embodiments, the composition including the modified release material can avoid or reduce compatibility issues between the enveloped additive and other components of the composition during transit of the composition to a subterranean location, as compared to other compositions including the additive. In various embodiments, the composition including the modified release material can avoid or reduce premature or rapid reaction of an additive with other components of the composition or with compounds combined with the composition downhole, as compared to other compositions including the additive. In various embodiments, the modified release material can provide controlled release of the additive therein at a more precise target temperature than other modified release materials. In various embodiments, the modified release material can provide controlled release of the additive therein with a more precisely controlled rate of release than other modified release materials. In various embodiments, the modified release material can reduce or prevent reaction of the additive therein with surrounding materials more effectively than other modified release materials.

In various embodiments, the modified release material can incorporate a wider variety of enveloped additives therein, as compared to other modified release materials. In various embodiments, a wide variety of inexpensive and readily available fatty acids can be used to form the modified release material. In various embodiments, the modified release material can be less expensive to generate than other modified release materials. In various embodiments, the modified release material can be formed more quickly than other modified release materials.

In various embodiments, the modified release material can prevent interference of incompatible chemistries between the additive and the surrounding materials, and can be pumped in combination with materials that are normally incompatible with the enveloped additive, such as other additives, without sacrificing fluid stability. In various embodiments, the modified release material can be used to avoid or reduce compatibility issues between the enveloped additive and contaminants that cause detrimental effects during any phase of the drilling operation to a subterranean location, such as contaminants from the drilled formation, from the water supply, and contaminants introduced at the surface to formulate and maintain the drilling fluid properties (e.g., cement, mixed salts, calcium carbonate, bicarbonate, and bacteria).

Method of Treating a Subterranean Formation.

In various embodiments, the present invention provides a modified release material and a method of using the same that provides a modified release of one or more subterranean treatment additives. A partially or wholly enveloping coating of one or more fatty acids can reduce or prevent direct interaction between the additive and the surrounding medium until a threshold temperature is reached, equal to or greater than the melting point of at least one fatty acid that envelops the additive, providing a controlled, prolonged, or delayed release of the additive.

In some embodiments, the present invention provides a method of treating a subterranean formation. The method includes placing a composition including a modified release material in the subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

In some embodiments, the method includes obtaining or providing the composition including the modified release material. The obtaining or providing of the composition can occur at any suitable time and at any suitable location. The obtaining or providing of the composition can occur above the surface (e.g., the composition can be formed above-surface). The obtaining or providing of the composition can occur in the subterranean formation (e.g., the composition can be formed downhole).

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing (e.g., the composition can be a hydraulic fracturing fluid, and the placing of the composition in the subterranean formation can include fracturing at least part of the subterranean formation to form at least one subterranean fracture), such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed in or contacted to, or the composition is placed in or contacted to an area surrounding the generated fracture or flow pathway.

In some embodiments, the method can be a method of fracturing, drilling, stimulation, acidizing, spotting, remedial treatment, applying a pill, clean-up, or a combination thereof.

The method can include allowing the fatty acid in the modified release material to melt in the subterranean formation, thereby releasing the additive in the subterranean formation. After the onset of melting, the release can be rapid or slow, depending on how close the ambient downhole temperature and the melting point of the fatty acid are, and depending on other materials present in the modified release material. In some embodiments, the additive is released or deposited in, adjacent to, or near a subterranean fracture, such as any suitable fracture, such as a fracture formed by fracturing using the composition.

Modified Release Material.

The composition includes a modified release material. The modified release material includes an additive and a fatty acid partially or wholly enveloping the additive. The composition can include one modified release material, or more than one modified release material. The modified release material exhibits a modified release of the additive therein, as compared to the additive without the encapsulating fatty acid. For example, the modified release material can be at least one of a controlled release material, a prolonged release material, a delayed release material, and an extended release material. Any suitable amount of the composition can be the modified release material. For example, the modified release material can be about 0.001 wt % to about 100 wt % of the composition, about 0.001 wt % to about 30 wt %, or about 0.001 wt % or less, or about 0.01 wt %, 0.1 wt %, 1, 2, 3, 4, 5, 6, 7, 8, 9, 10, 12, 14, 16, 18, 20, 22, 24, 26, 28, 30, 35, 40, 45, 50, 55, 60, 65, 70, 75, 80, 85, 90, 95, or about 100 wt %.

The modified release material can have any suitable shape, form, or configuration, such that the method can be carried out as described herein. The modified release material can be a plurality of particles of the modified release material. Each particle of the modified release material can independently have any suitable number of particles of the additive therein, such as about 1 to about 100,000 particles of the additive, about 2 to about 100,000, about 1 to about 100, about 1 to about 5, or about 1 particle of the additive, 2, 3, 4, 5, 6, 7, 8, 9, 10, 15, 20, 25, 30, 40, 50, 75, 100, 150, 200, 250, 500, 750, 1,000, 5,000, 10,000, 15,000, 20,000, 25,000, 50,000, or about 100,000 particles or more. In some embodiments, a particle of the modified release material can have a single particle of additive therein, wherein the core of the particle includes or is the additive particle, and the shell of the modified release material includes or is the fatty acid. In some embodiments, a particle of the modified release material includes multiple particles of additive, such as in a core of the particle, or as an amalgam between the additive particles and the fatty acid (e.g., a matrix of fatty acid having additive particles therein) wherein the additive particles are distributed heterogeneously or approximately homogeneously throughout the amalgam.

The fatty acid can envelop (e.g., cover) any suitable amount of the total surface area of the combined additive particles. In some embodiments, such as wherein a particle of the modified release material is an amalgam with approximately homogenous distribution of the additive in the fatty acid, some portions of the additive at the exterior of the amalgam can be exposed to the exterior environment. In some embodiments, a particle of the modified release material is an amalgam of the additive and the fatty acid with a heterogeneous distribution of the additive therein at least at the exterior surface, such that substantially all the additive is covered by the fatty acid and isolated from the exterior environment. In some embodiments, such as wherein a particle of the modified release material includes a core that includes one or more additive particles, the additive particles can be completely (e.g., wholly) enveloped by the fatty acid and can have substantially no portion thereof exposed to the exterior environment. In various embodiments, the one or more fatty acids can cover about 10% to about 100% of the total surface area of the combined additive particles (e.g., the surface area of all additive particles in the modified release material), about 50% to about 100%, about 80% to about 100%, or about 10% or less, or about 15%, 20, 25, 30, 35, 40, 45, 50, 55, 60, 65, 70, 75, 80, 82, 84, 86, 88, 90, 92, 94, 96, 98, or about 100%.

Additive.

The modified release material includes an additive. The modified release material can include one additive, or multiple additives. The additive can be a solid at standard temperature and pressure. The additive can be a liquid at standard temperature and pressure. The one or more additives can form any suitable proportion of the modified release material. For example, the modified release material can be a plurality of modified release material particles, wherein about 0.001 wt % to about 99 wt % of each modified release material particle is independently the one or more additives, about 10 wt % to about 80 wt %, or about 0.001 wt % or less, or about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 wt % or more.

The additive can be any suitable additive for subterranean treatment. In some embodiments, the additive is a fracturing fluid additive. The additive can be at least one of an alkalinity control agent, an acidity control agent, an emulsifier, a dispersant, a polymeric stabilizer, a polymer, an antioxidant, a heat stabilizer, a foam control agent, a plasticizer, a pigment, a dye, a precipitating agent, an oil-wetting agent, a set-retarding additive, a surfactant, a corrosion inhibitor, a lost circulation material, a filtration control additive, a salt, a fiber, a thixotropic additive, a breaker, a crosslinker, a rheology modifier, a curing accelerator, a curing retarder, a pH modifier (e.g., an acid or a base), a chelating agent, a scale inhibitor, an enzyme, a resin, a scale inhibitor, a clay control additive, a buffer, a sand-coating material, a biocide, and a water control material. In some embodiments, the additive can be at least one of a clay control additive, a scale inhibitor, a buffer, a resin, a sand-coating material, a surfactant, a breaker, a pH modifier, and a biocide.

In some embodiments, the additive is a pH modifier, such as an acid or a base. By using a fatty acid-enveloped pH modifier, adjustment of pH at the surface can be avoided. For example, the pH modifier can be a base designed to be released downhole in the presence of a crosslinker (e.g., a borate crosslinker), providing better fluid stability during transit to the subterranean location as compared to modification of the pH of the fluid at the surface.

In some embodiments, the additive is a breaker. By using a fatty acid-enveloped breaker, the release of the breaker can be delayed, controlling the breaking of surrounding viscosifiers, such as controlling hydrolysis reactions of viscosifiers such as guar, guar derivatives (e.g., carboxymethyl hydroxypropyl guar, hydroxypropyl guar), cellulose, and cellulose derivatives (e.g., carboxymethyl cellulose, carboxymethyl hydroxyethyl cellulose). The breaker can be any suitable breaker, such that on release into the subterranean formation the viscosity of the composition or the fluid surrounding the composition (e.g., a fracturing fluid) can be at least partially broken for more complete and more efficient recovery thereof, such as at the conclusion of a hydraulic fracturing treatment. The breaker can be at least one of an oxidative breaker and an enzymatic breaker. The breaker can be a salt that is chosen from a chloride, fluoride, bromide, phosphate, and sulfate salt of an ion selected from the group of $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, $Al^{3+}$, and a combination thereof. The breaker can be a salt that is chosen from a persulfate, percarbonate, perborate, peroxide, perphosphate, permanganate, chlorite, and hypochlorite salt of an ion selected from the group of $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, $Al^{3+}$, and a combination thereof. The breaker can be chosen from an alpha or beta amylase, amyloglucosidase, oligoglucosidase, invertase, maltase, cellulase, hemi-cellulase, and mannanohydrolase.

Fatty Acid.

The modified release material includes a substituted or unsubstituted fatty acid that partially or wholly envelops the additive. The modified release material can include a single fatty acid or multiple fatty acids. The fatty acid is a solid at the time of placing in the subterranean formation, but can melt downhole to release the additive therein, such as when a depth or location is reached having a temperature at or greater than the melting point of the fatty acid. The one or more fatty acids can form any suitable proportion of the modified release material. For example, in some embodiments, the modified release material can be a plurality of modified release material particles, wherein about 1 wt % to about 99.999 wt % of each modified release material particle is independently the one or more fatty acids, about 20 wt % to about 90 wt %, or about 1 wt % or less, or about 2 wt %, 3, 4, 5, 6, 7, 8, 9, 10, 12, 14, 16, 18, 20, 22, 24, 26, 28, 30, 32, 34, 36, 38, 40, 45, 50, 55, 60, 65, 70, 75, 80, 81, 82, 83, 84, 85, 86, 87, 88, 89, 90, 91, 92, 93, 94, 95, 96, 97, 98, 99, 99.9, 99.99, or about 99.999 wt % or more.

The fatty acid can have any suitable melting point, such that the method can be performed as described herein. The fatty acid can have a melting point that is equal to or lower than a bottom-hole temperature of the subterranean formation where the composition is placed, or that is equal to or lower than the temperature of the portion of the subterranean formation where the additive is desired to be released. For example, the melting point of the fatty acid can be about 30° C. to about 250° C., about 40° C. to about 150° C., about 50° C. to about 100° C., or about 30° C. or less, or about 32° C., 34, 36, 38, 40, 42, 44, 46, 48, 50, 52, 54, 56, 58, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245° C., or about 250° C. or higher. In embodiments including multiple fatty acids in the modified release material, the melting point of at least one fatty acid is equal to or lower than a bottom-hole temperature of the subterranean formation where the composition is placed, or that is equal to or lower than the temperature of the portion of the subterranean formation where the additive is desired to be released.

The fatty acid can be any suitable fatty acid, such that the method can be carried out as described herein. For example, the fatty acid can be a substituted or unsubstituted ($C_8$-$C_{100}$) hydrocarbyl-COOH. The fatty acid can be a substituted or unsubstituted ($C_{10}$-$C_{50}$)hydrocarbyl-COOH. The fatty acid can be unsubstituted. The fatty acid can be chosen from capric acid (decanoic acid, $CH_3(CH_2)_8COOH$, melting point of about 31.6° C.), undecylic acid (undecanoic acid, $CH_3(CH_2)_9COOH$, melting point of about 28.6° C.), lauric acid (dodecanoic acid, $CH_3(CH_2)_{10}COOH$, melting point of about 43.8° C.), tridecylic acid (tridecanoic acid, $CH_3(CH_2)_{11}COOH$, melting point of about 41.5° C.), myristic acid (tetradecanoic acid, $CH_3(CH_2)_{12}COOH$, melting point of about 54.4° C.), pentadecylic acid (pentadecanoic acid, $CH_3(CH_2)_{13}COOH$, melting point of about 51-53° C.), palmitic acid (hexadecanoic acid, $CH_3(CH_2)_{14}COOH$, melting point of about 62.9° C.), margaric acid (heptadecanoic acid, $CH_3(CH_2)_{15}COOH$, melting point of about 61.3° C.), stearic acid (octadecanoic acid, $CH_3(CH_2)_{16}COOH$, melting point of about 69.3° C.), nonadecylic acid (nonadecanoic acid, $CH_3(CH_2)_{17}COOH$, melting point of about 68-70° C.), arachidic acid (eicosanoic acid, $CH_3(CH_2)_{18}COOH$, melting point of about 75.5° C.), heneicosylic acid (heneicosanoic acid, $CH_3(CH_2)_{19}COOH$, melting point of about 75° C.), behenic acid (docosanoic acid, $CH_3(CH_2)_{20}COOH$, melting point of about 80° C.), tricosylic acid (tricosanoic acid, $CH_3(CH_2)_{21}COOH$, melting point of about 80° C.), lignoceric acid (tetracosanoic acid, $CH_3(CH_2)_{22}COOH$, melting point of about 84.2° C.), pentacosylic acid (pentacosanoic acid, $CH_3(CH_2)_{23}COOH$, melting point of about 83° C.), cerotic acid (hexacosanoic acid, $CH_3(CH_2)_{24}COOH$, melting point of about 87-89° C.), heptacosylic acid (heptacosanoic acid, $CH_3(CH_2)_{25}COOH$, melting point of about 86° C.), montanic acid (octacosanoic acid, $CH_3(CH_2)_{26}COOH$, melting point of about 90.9° C.), nonacosylic acid (nonacosanoic acid, $CH_3(CH_2)_{27}COOH$, melting point of about 90° C.), melissic acid (triacontanoic acid, $CH_3(CH_2)_{28}COOH$, melting point of about 92-94° C.), henatriacontylic acid (henatriacontanoic acid, $CH_3(CH_2)_{29}COOH$, melting point of about 109.3° C.-109.6° C.), lacceroic acid (dotriacontanoic acid, $CH_3(CH_2)_{30}COOH$), psyllic acid (tritriacontanoic acid, $CH_3(CH_2)_{31}COOH$), geddic acid (tetratriacontanoic acid, $CH_3(CH_2)_{32}COOH$, melting point of about 188° C.), ceroplastic acid (pentatriacontanoic acid, $CH_3(CH_2)_{33}COOH$), hexatriacontylic acid (hexatriacontanoic acid, $CH_3(CH_2)_{34}COOH$), crotonic acid ((E)-but-2-enoic acid, $C_3H_5CO_2H$, melting point of about 70-73° C.), sapienic acid ((Z)-6-hexadecenoic acid, $C_{15}H_{29}CO_2H$), elaidic acid ((E)-octadec-9-enoic acid, $C_{17}H_{33}CO_2H$, melting point of about 43-45° C.), vaccenic acid ((Z)-octadec-11-enoic acid, $C_{17}H_{33}CO_2H$), petroselinic acid ((cis-6-octadecenoic acid, $C_{17}H_{33}CO_2H$, melting point of about 30° C.), erucic acid ((Z)-docos-13-enoic acid, $C_{21}H_{41}CO_2H$, melting point of about 33-35° C.), nervonic acid ((Z)-tetracos-15-enoic acid, $C_{23}H_{45}CO_2H$, melting point of about 42-43° C.), paullinic acid $(CH_3(CH_2)_5CH=CH(CH_2)_{11}COOH)$, and gondoic acid $(CH_3(CH_2)_7CH=CH(CH_2)_9COOH$, melting point of about 25-32° C.). In some embodiments, the fatty acid is chosen from fatty acids having a melting point of about 100° F. (37.8° C.) to about 190° F. (87.8° C.), such as chosen from palmitic acid (hexadecanoic acid, $CH_3(CH_2)_{14}COOH$, melting point of about 62.9° C.), elaidic acid ((E)-octadec-9-enoic acid, $C_{17}H_{33}CO_2H$, melting point of about 43-45° C.), lauric acid (dodecanoic acid, $CH_3(CH_2)_{10}COOH$, melting point of about 43.8° C.), stearic acid (octadecanoic acid, $CH_3(CH_2)_{16}COOH$, melting point of about 69.3° C.), cerotic acid (hexacosanoic acid, $CH_3(CH_2)_{24}COOH$, melting point of about 87-89° C.), myristic acid (tetradecanoic acid, $CH_3(CH_2)_{12}COOH$, melting point of about 54.4° C.), behenic acid (docosanoic acid, $CH_3(CH_2)_{20}COOH$, melting point of about 80° C.), arachidic acid (eicosanoic acid, $CH_3(CH_2)_{18}COOH$, melting point of about 75.5° C.), lignoceric acid (tetracosanoic acid, $CH_3(CH_2)_{22}COOH$, melting point of about 84.2° C.).

Other Components.

The composition including the modified release material, or a mixture including the composition, can include any suitable additional component in any suitable proportion, such that the modified release material, composition, or mixture including the same, can be used as described herein. Any component listed in this section can be present or not present in the composition or a mixture including the same. Any component listed in this section can be present or not present in the modified release material, in the additive of the modified release material, or in the fatty acid of the modified release material. Any component listed in this section can be present in the modified release material (e.g., as an additive, with the additive, or with the fatty acid), or in the composition that includes the modified release material (e.g., as a secondary additive, in addition to the additive in the modified release material).

In some embodiments, the composition or a mixture including the same includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the composition or a mixture including the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly (($C_1$-$C_{20}$)alkenyl)-substituted mono- or poly-($C_1$-$C_{20}$)alkyl ether (e.g., pentaerythritol allyl ether), and a poly($C_2$-$C_{20}$) alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition or a mixture including the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the composition or a mixture including the same can include one or more breakers (e.g., secondary breakers, in addition to any breaker in the modified release material). The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the modified release material or a mixture including the same can include any suitable downhole fluid. The composition including the modified release material can be combined with any suitable downhole fluid before, during, or after the placement of the composition in the subterranean formation or the contacting of the composition and the subterranean material. In some examples, the composition including the modified release material is combined with a downhole fluid above the surface, and then the combined composition is placed in a subterranean formation or contacted with a subterranean material. In another example, the composition including the modified release material is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUA-GEL® viscosifiers; THERMA—CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOPPIT™, PLUG-GIT®, BARAC-ARB®, DUO-SQUEEZE®, BAROFIBRE™, STEEL-SEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the composition or a mixture including the same in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the composition including the modified release material disclosed herein can directly or indirectly affect one or more components or pieces of equipment associated with the preparation, delivery, recapture, recycling, reuse, and/or disposal of the disclosed composition including the modified release material. For example, and with reference to FIG. 1, the disclosed composition including the modified release material can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including the modified release material can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including the modified release material can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including the modified release material can be stored, reconditioned, and/or regulated until added to the drilling fluid 122.

As mentioned above, the composition including the modified release material can directly or indirectly affect the components and equipment of the drilling assembly 100. For example, the composition including the modified release material can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including the modified release material.

The composition including the modified release material can directly or indirectly affect the pump 120, which representatively includes any conduits, pipelines, trucks, tubulars, and/or pipes used to fluidically convey the composition including the modified release material to the subterranean formation; any pumps, compressors, or motors (e.g., topside or downhole) used to drive the composition into motion; any valves or related joints used to regulate the pressure or flow rate of the composition; and any sensors (e.g., pressure, temperature, flow rate, and the like), gauges, and/or combinations thereof, and the like. The composition including the modified release material can also directly or indirectly affect the mixing hopper 134 and the retention pit 132 and their assorted variations.

The composition including the modified release material can also directly or indirectly affect the various downhole or subterranean equipment and tools that can come into contact with the composition including the modified release material such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including the modified release material can also directly or indirectly affect any downhole heat exchangers, valves and corresponding actuation devices, tool seals, packers and other wellbore isolation devices or components, and the like associated with the wellbore 116. The composition including the modified release material can also directly or indirectly affect the drill bit 114, which can include roller cone bits, polycrystalline diamond compact (PDC) bits, natural diamond bits, hole openers, reamers, coring bits, and the like.

While not specifically illustrated herein, the composition including the modified release material can also directly or indirectly affect any transport or delivery equipment used to convey the composition including the modified release material to the drilling assembly 100 such as, for example, any transport vessels, conduits, pipelines, trucks, tubulars, and/or pipes used to fluidically move the composition including the modified release material from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including a modified release material that includes an additive and a solid substituted or unsubstituted fatty acid having a melting point of about 30° C. to about 250° C., wherein the additive is partially or wholly enveloped by the fatty acid. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a drilling operation, or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the modified release material described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 2:
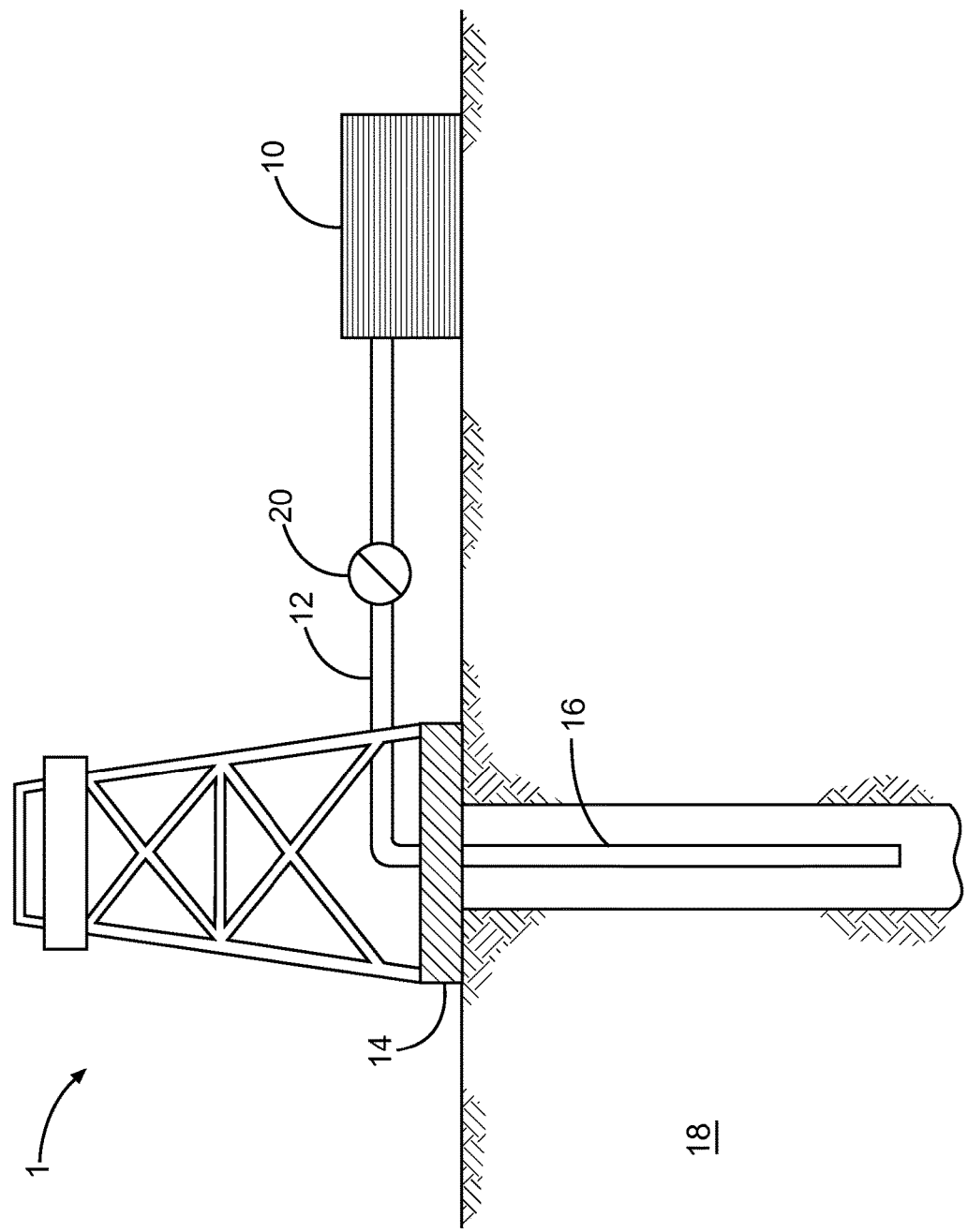
FIG. 2 illustrates a system or apparatus for delivering a composition to a subterranean formation, in accordance with various embodiments.

FIG. 2 shows an illustrative schematic of systems and apparatuses that can deliver embodiments of the compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of modified release material, or can have no modified release material therein, due to release of the active agent in the subterranean formation. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include a modified release material, such as any modified release material described herein. The modified release material can include an additive. The modified release material can also include a solid substituted or unsubstituted fatty acid having a melting point of about 30° C. to about 250° C., wherein the additive is partially or wholly enveloped by the fatty acid.

In some embodiments, the composition further includes a downhole fluid. The composition can be a downhole fluid. The downhole fluid can be any suitable downhole fluid. In some embodiments, the downhole fluid is a composition for fracturing of a subterranean formation. In various embodiments, the composition includes a modified release material including a solid breaker and a solid substituted or unsubstituted fatty acid having a melting point of about 40° C. to about 250° C., wherein the breaker is partially or wholly enveloped by the fatty acid. The modified release material can be about 0.001 wt % to about 30 wt % of the composition. The modified release material can include a plurality of modified release material particles, each particle of the modified release material having about 1 to about 100,000 particles of the breaker therein. About 10 wt % to about 80 wt % of each modified release material particle can be the breaker. About 20 wt % to about 90 wt % of each modified release material particle can be the fatty acid. The fatty acid can cover about 50% to about 100% of the total surface area of the combined breaker particles.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a modified release material, such as any modified release material described herein. The modified release material can include an additive. The modified release material can also include a solid substituted or unsubstituted fatty acid having a melting point of about 30° C. to about 250° C., wherein the additive is partially or wholly enveloped by the fatty acid.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in the subterranean formation a composition comprising a modified release material comprising
an additive; and
a solid substituted or unsubstituted fatty acid having a melting point of about 30° C. to about 250° C., wherein the additive is partially or wholly enveloped by the fatty acid.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein the composition comprising the modified release material is a fracturing fluid.

Embodiment 5 provides the method of any one of Embodiments 1-4, wherein the placing of the composition in the subterranean formation comprises fracturing at least part of the subterranean formation to form at least one subterranean fracture.

Embodiment 6 provides the method of any one of Embodiments 1-5, further comprising melting the fatty acid in the subterranean formation, thereby releasing the additive in the subterranean formation.

Embodiment 7 provides the method of Embodiment 6, wherein the additive is released in a subterranean fracture.

Embodiment 8 provides the method of any one of Embodiments 1-7, wherein the modified release material is at least one of a controlled release material, a prolonged release material, a delayed release material, and an extended release material.

Embodiment 9 provides the method of any one of Embodiments 1-8, wherein the modified release material is about 0.001 wt % to about 100 wt % of the composition.

Embodiment 10 provides the method of any one of Embodiments 1-9, wherein the modified release material is about 0.001 wt % to about 30 wt % of the composition.

Embodiment 11 provides the method of any one of Embodiments 1-10, wherein the modified release material comprises a plurality of modified release material particles, each particle of the modified release material having about 1 to about 100,000 particles of the additive therein.

Embodiment 12 provides the method of any one of Embodiments 1-11, wherein the modified release material comprises a plurality of modified release material particles, each particle of the modified release material having 1 particle of the additive therein.

Embodiment 13 provides the method of Embodiment 12, wherein each particle of the modified release material comprises a core comprising the additive and a shell comprising the fatty acid.

Embodiment 14 provides the method of any one of Embodiments 1-13, wherein the modified release material comprises a plurality of modified release material particles, each particle of the modified release material having about 2 to about 100,000 particles of the additive therein.

Embodiment 15 provides the method of Embodiment 14, wherein the modified release material particles are an amalgam of the additive and the fatty acid.

Embodiment 16 provides the method of any one of Embodiments 1-15, wherein the fatty acid covers about 50% to about 100% of the total surface area of the combined additive particles.

Embodiment 17 provides the method of any one of Embodiments 1-16, wherein the fatty acid covers about 100% of the total surface area of the combined additive particles.

Embodiment 18 provides the method of any one of Embodiments 1-17, wherein the modified release material comprises a plurality of modified release material particles, wherein about 0.001 wt % to about 99 wt % of each modified release material particle is the additive.

Embodiment 19 provides the method of Embodiment 18, wherein about 10 wt % to about 80 wt % of each modified release material particle is the additive.

Embodiment 20 provides the method of any one of Embodiments 1-19, wherein the additive is a solid at standard temperature and pressure.

Embodiment 21 provides the method of any one of Embodiments 1-20, wherein the additive is a liquid at standard temperature and pressure.

Embodiment 22 provides the method of any one of Embodiments 1-21, wherein the additive is a fracturing fluid additive.

Embodiment 23 provides the method of any one of Embodiments 1-22, wherein the additive is at least one of an alkalinity control agent, an acidity control agent, an emulsifier, a dispersant, a polymeric stabilizer, a polymer, an antioxidant, a heat stabilizer, a foam control agent, a plasticizer, a pigment, a dye, a precipitating agent, an oil-wetting agent, a set-retarding additive, a surfactant, a corrosion inhibitor, a lost circulation material, a filtration control additive, a salt, a fiber, a thixotropic additive, a breaker, a crosslinker, a rheology modifier, a curing accelerator, a curing retarder, a pH modifier, a chelating agent, a clay control additive, a buffer, a scale inhibitor, an enzyme, a resin, a scale inhibitor, a sand-coating material, a biocide, and a water control material.

Embodiment 24 provides the method of any one of Embodiments 1-23, wherein the additive is at least one of a clay control additive, a scale inhibitor, a buffer, a resin, a sand-coating material, a surfactant, a breaker, a pH modifier, and a biocide.

Embodiment 25 provides the method of any one of Embodiments 1-24, wherein the additive is a breaker.

Embodiment 26 provides the method of Embodiment 25, wherein the breaker is at least one of an oxidative breaker and an enzymatic breaker.

Embodiment 27 provides the method of any one of Embodiments 25-26, wherein the breaker is a salt that is selected from the group consisting of a chloride, fluoride, bromide, phosphate, and sulfate salt of an ion selected from the group of $Na^+$, $K^+$, $Li^+$, $Zn^+$, $NH_4^+$, $Fe^{2+}$, $Fe^{3+}$, $Cu^{1+}$, $Cu^{2+}$, $Ca_{2+}$, $Mg^{2+}$, $Zn^{2+}$, $Al^{3+}$, and a combination thereof.

Embodiment 28 provides the method of any one of Embodiments 25-27, wherein the breaker is a salt that is selected from the group consisting of a persulfate, percarbonate, perborate, peroxide, perphosphate, permanganate, chlorite, and hypochlorite salt of an ion selected from the group of $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, $Al^{3+}$, and a combination thereof.

Embodiment 29 provides the method of any one of Embodiments 25-28, wherein the breaker is selected from the group consisting of an alpha or beta amylase, amyloglucosidase, oligoglucosidase, invertase, maltase, cellulase, hemi-cellulase, and mannanohydrolase.

Embodiment 30 provides the method of any one of Embodiments 1-29, wherein the modified release material comprises a plurality of modified release material particles, wherein about 1 wt % to about 99.999 wt % of each modified release material particle is the fatty acid.

Embodiment 31 provides the method of Embodiment 30, wherein about 20 wt % to about 90 wt % of each modified release material particle is the fatty acid.

Embodiment 32 provides the method of any one of Embodiments 1-31, wherein the melting point of the fatty acid is below a bottom-hole temperature in the subterranean formation.

Embodiment 33 provides the method of any one of Embodiments 1-32, wherein the melting point of the fatty acid is about 40° C. to about 150° C.

Embodiment 34 provides the method of any one of Embodiments 1-33, wherein the melting point of the fatty acid is about 50° C. to about 100° C.

Embodiment 35 provides the method of any one of Embodiments 1-34, wherein the fatty acid is a substituted or unsubstituted $(C_8-C_{100})$hydrocarbyl-COOH.

Embodiment 36 provides the method of any one of Embodiments 1-35, wherein the fatty acid is a substituted or unsubstituted $(C_{10}-C_{50})$hydrocarbyl-COOH.

Embodiment 37 provides the method of any one of Embodiments 1-36, wherein the fatty acid is an unsubstituted $(C_{10}-C_{50})$hydrocarbyl-COOH.

Embodiment 38 provides the method of any one of Embodiments 1-37, wherein the fatty acid is selected from the group consisting of capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacosylic acid, melissic acid, henatriacontylic acid, lacceroic acid, psyllic acid, geddic acid, ceroplastic acid, hexatriacontylic acid, crotonic acid, sapienic acid, elaidic acid, vaccenic acid, petroselinic acid, erucic acid, nervonic acid, paullinic acid, and gondoic acid.

Embodiment 39 provides the method of any one of Embodiments 1-38, wherein the fatty acid is selected from the group consisting of palmitic acid, elaidic acid, lauric acid, stearic acid, cerotic acid, myristic acid, behenic acid, arachidic acid, and lignoceric acid.

Embodiment 40 provides the method of any one of Embodiments 1-39, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, or a combination thereof, to form a mixture, wherein the placing the composition in the subterranean formation comprises placing the mixture in the subterranean formation.

Embodiment 41 provides the method of any one of Embodiments 1-40, wherein the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, or a combination thereof.

Embodiment 42 provides the method of any one of Embodiments 1-41, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 43 provides the method of any one of Embodiments 1-42, wherein the composition further comprises a proppant, a resin-coated proppant, or a combination thereof.

Embodiment 44 provides the method of any one of Embodiments 1-43, wherein the placing of the composition in the subterranean formation comprises pumping the composition through a tubular disposed in a wellbore and into the subterranean formation.

Embodiment 45 provides a system for performing the method of any one of Embodiments 1-44, the system comprising:
  a tubular disposed in the subterranean formation; and
  a pump configured to pump the composition in the subterranean formation through the tubular.

Embodiment 46 provides a method of treating a subterranean formation, the method comprising:
  placing in the subterranean formation a composition comprising a modified release material comprising
    a solid breaker; and
    a solid substituted or unsubstituted fatty acid having a melting point of about 40° C. to about 250° C., wherein the breaker is partially or wholly enveloped by the fatty acid; and
  melting the fatty acid in the subterranean formation, thereby releasing the breaker in the subterranean formation;
  wherein
    the modified release material is about 0.001 wt % to about 30 wt % of the composition,
    the modified release material comprises a plurality of modified release material particles, each particle of the modified release material having about 1 to about 100,000 particles of the breaker therein,
    about 10 wt % to about 80 wt % of each modified release material particle is the breaker,
    about 20 wt % to about 90 wt % of each modified release material particle is the fatty acid, and
    the fatty acid covers about 50% to about 100% of the total surface area of the combined breaker particles.

Embodiment 47 provides a system comprising:
  a tubular disposed in a subterranean formation; and
  a pump configured to pump a composition comprising a modified release material in the subterranean formation through the tubular, wherein the modified release material comprises
    an additive; and
    a solid substituted or unsubstituted fatty acid having a melting point of about 30° C. to about 250° C., wherein the additive is partially or wholly enveloped by the fatty acid.

Embodiment 48 provides a composition for treatment of a subterranean formation, the composition comprising:
  a modified release material comprising
    an additive; and
    a solid substituted or unsubstituted fatty acid having a melting point of about 30° C. to about 250° C., wherein the additive is partially or wholly enveloped by the fatty acid.

Embodiment 49 provides the composition of Embodiment 48, wherein the composition is a composition for fracturing of the subterranean formation.

Embodiment 50 provides a composition for treatment of a subterranean formation, the composition comprising:
  a modified release material comprising
    a solid breaker; and
    a solid substituted or unsubstituted fatty acid having a melting point of about 40° C. to about 250° C., wherein the breaker is partially or wholly enveloped by the fatty acid;
  wherein
    the modified release material is about 0.001 wt % to about 30 wt % of the composition,
    the modified release material comprises a plurality of modified release material particles, each particle of the modified release material having about 1 to about 100,000 particles of the breaker therein,
    about 10 wt % to about 80 wt % of each modified release material particle is the breaker,
    about 20 wt % to about 90 wt % of each modified release material particle is the fatty acid, and
    the fatty acid covers about 50% to about 100% of the total surface area of the combined breaker particles.

Embodiment 51 provides a method of preparing a composition for treatment of a subterranean formation, the method comprising:
  forming a composition comprising a modified release material comprising
    an additive; and
    a solid substituted or unsubstituted fatty acid having a melting point of about 30° C. to about 250° C., wherein the additive is partially or wholly enveloped by the fatty acid.

Embodiment 52 provides the composition, method, or system of any one or any combination of Embodiments 1-51 optionally configured such that all elements or options recited are available to use or select from.

What is claimed is:

1. A method of treating a subterranean formation, comprising:
  placing in the subterranean formation a composition comprising a plurality of modified release material particles, each of the modified release material particles comprising a core comprising an oxidative breaker and a shell partially or wholly enveloping the core and consisting of one or more solid unsubstituted fatty acids, wherein the shell has a melting point of about 50°

C. to about 100° C. and wherein the melting point is a threshold temperature equal to or lower than a bottom-hole temperature of the subterranean formation, wherein the oxidative breaker is a persulfate salt;

providing a delayed release of the core in the subterranean formation solely by melting the shell in the subterranean formation at or above the threshold temperature; and breaking the viscosity of the composition or a surrounding fracturing fluid with the persulfate salt at or above the threshold temperature, wherein the composition or the surrounding fracturing fluid comprises a viscosifier comprising guar or a guar derivative.

2. The method of claim 1, wherein the composition comprising the modified release material particles is a fracturing fluid, and wherein the placing of the composition in the subterranean formation comprises fracturing at least part of the subterranean formation to form at least one subterranean fracture.

3. The method of claim 2, wherein the composition further comprises a proppant.

4. The method of claim 2, wherein the oxidative breaker is released in the at least one subterranean fracture.

5. The method of claim 1, wherein the modified release material particles are about 0.001 wt % to about 30 wt % of the composition.

6. The method of claim 1, wherein the shell wholly envelops the core.

7. The method of claim 1, wherein about 10 wt % to about 80 wt % of each of the modified release material particles is the oxidative breaker.

8. The method of claim 1, wherein the oxidative breaker is a solid at standard temperature and pressure.

9. The method of claim 1, wherein the core further comprises at least one of a clay control additive, a scale inhibitor, a resin, a sand-coating material, another oxidative breaker, or a biocide.

10. The method of claim 1, wherein about 20 wt % to about 90 wt % of each of the modified release material particles is the one or more solid unsubstituted fatty acids.

11. The method of claim 1, wherein the one or more solid unsubstituted fatty acids is selected from the group consisting of myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacosylic acid, melissic acid, and crotonic acid.

12. The method of claim 1, wherein the one or more solid unsubstituted fatty acids is selected from the group consisting of palmitic acid, stearic acid, cerotic acid, myristic acid, behenic acid, arachidic acid, and lignoceric acid.

13. A system for performing the method of claim 1, the system comprising:
a tubular disposed in the subterranean formation; and
a pump configured to pump the composition in the subterranean formation through the tubular.

14. A method of treating a subterranean formation, comprising:
placing in the subterranean formation a composition comprising a plurality of modified release material particles, each of the modified release material particles comprising a core comprising a solid oxidative breaker, and a shell partially or wholly enveloping the core and consisting of one or more solid unsubstituted fatty acids, wherein the shell has a melting point of about 50° C. to about 100° C. and wherein the melting point is a threshold temperature equal to or lower than a bottom-hole temperature of the subterranean formation, wherein the oxidative breaker is a persulfate salt;

providing a delayed release of the oxidative breaker in the subterranean formation solely by melting the shell in the subterranean formation at or above the threshold temperature;

breaking the viscosity of the composition or a surrounding fracturing fluid with the persulfate salt at or above the threshold temperature, wherein the composition or the surrounding fracturing fluid comprises a viscosifier comprising guar or a guar derivative, and further wherein the modified release material particles are about 0.001 wt % to about 30 wt % of the composition, each of the modified release material particles has 1 to 100,000 particles of the oxidative breaker therein, about 10 wt % to about 80 wt % of each of the modified release material particles is the oxidative breaker, about 20 wt % to about 90 wt % of each of the modified release material particles is the one or more solid unsubstituted fatty acids, and the one or more solid unsubstituted fatty acids of the shell covers about 50% to about 100% of the total surface area of the oxidative breaker particles of the core.

15. A composition for treatment of a subterranean formation, comprising:
a plurality of modified release material particles, each of the modified release particles comprising a core comprising a solid oxidative breaker, and a shell partially or wholly enveloping the core and consisting of one or more solid unsubstituted fatty acids, wherein the shell has a melting point of about 50° C. to about 100° C. and wherein the melting point is a threshold temperature, and a bottom-hole temperature of the subterranean formation equal to or greater than the threshold temperature provides a delayed release of the core solely by melting the shell in the subterranean formation;
wherein the oxidative breaker is a persulfate salt;
wherein the persulfate salt is active to break the viscosity of the composition or a surrounding fracturing fluid at or above the threshold temperature, wherein the composition or the surrounding fracturing fluid comprises a viscosifier comprising guar or a guar derivative; and
wherein the modified release material particles are about 0.001 wt % to about 30 wt % of the composition, each of the modified release material particles has 1 to 100,000 particles of the oxidative breaker therein, about 10 wt % to about 80 wt % of each of the modified release material particles is the oxidative breaker, about 20 wt % to about 90 wt % of each of the modified release material particles is the one or more solid unsubstituted fatty acid, and the one or more solid unsubstituted fatty acids of the shell covers about 50% to about 100% of the total surface area of the oxidative breaker particles of the core.

* * * * *